(12) United States Patent
Iwamoto et al.

(10) Patent No.: US 11,919,157 B2
(45) Date of Patent: Mar. 5, 2024

(54) CONVEYANCE SYSTEM, CONVEYANCE METHOD AND COMPUTER-READABLE RECORDING MEDIUM

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/546,244

(22) Filed: Dec. 9, 2021

(65) Prior Publication Data

US 2022/0250239 A1    Aug. 11, 2022

(30) Foreign Application Priority Data

Feb. 5, 2021    (JP) .................. 2021-017625

(51) Int. Cl.
*B25J 9/04*    (2006.01)
*B25J 9/12*    (2006.01)
*B25J 18/04*    (2006.01)

(52) U.S. Cl.
CPC .............. *B25J 9/042* (2013.01); *B25J 9/126* (2013.01); *B25J 18/04* (2013.01); *Y10S 901/01* (2013.01)

(58) Field of Classification Search
None
See application file for complete search history.

(56) References Cited

U.S. PATENT DOCUMENTS

| | | | | |
|---|---|---|---|---|
| 5,672,044 A | * | 9/1997 | Lemelson | B25J 5/007 901/41 |
| 10,300,604 B2 | * | 5/2019 | Ochiishi | B25J 19/0075 |
| 10,913,641 B2 | * | 2/2021 | Gravelle | B66F 9/122 |
| 11,613,022 B2 | * | 3/2023 | Hibino | B25J 9/042 700/259 |
| 11,738,944 B2 | * | 8/2023 | Iwamoto | B66F 9/20 414/807 |
| 2015/0071743 A1 | * | 3/2015 | Lert, Jr. | B65G 1/1378 414/807 |
| 2020/0094399 A1 | * | 3/2020 | Shindo | B25J 9/042 |

FOREIGN PATENT DOCUMENTS

| | | |
|---|---|---|
| CN | 106516535 A | 3/2017 |
| JP | 2578732 B2 | 2/1997 |
| JP | H1129207 A | 2/1999 |
| JP | 2013234048 A | 11/2013 |

* cited by examiner

*Primary Examiner* — Michael S Lowe
(74) *Attorney, Agent, or Firm* — Dickinson Wright, PLLC

(57) ABSTRACT

In a conveyance system, an object is conveyed by use of a conveyance robot. The conveyance robot includes: an arm including a shaft portion extensible and retractable in an axial direction of the shaft portion, and a protruding portion extending from the shaft portion in a direction different from the axial direction so as to be engaged with a groove formed on the object; a drive mechanism configured to rotate the arm around the axial direction as a rotating axis; and a detecting portion configured to detect an abnormality in the rotation angle of the arm.

20 Claims, 14 Drawing Sheets

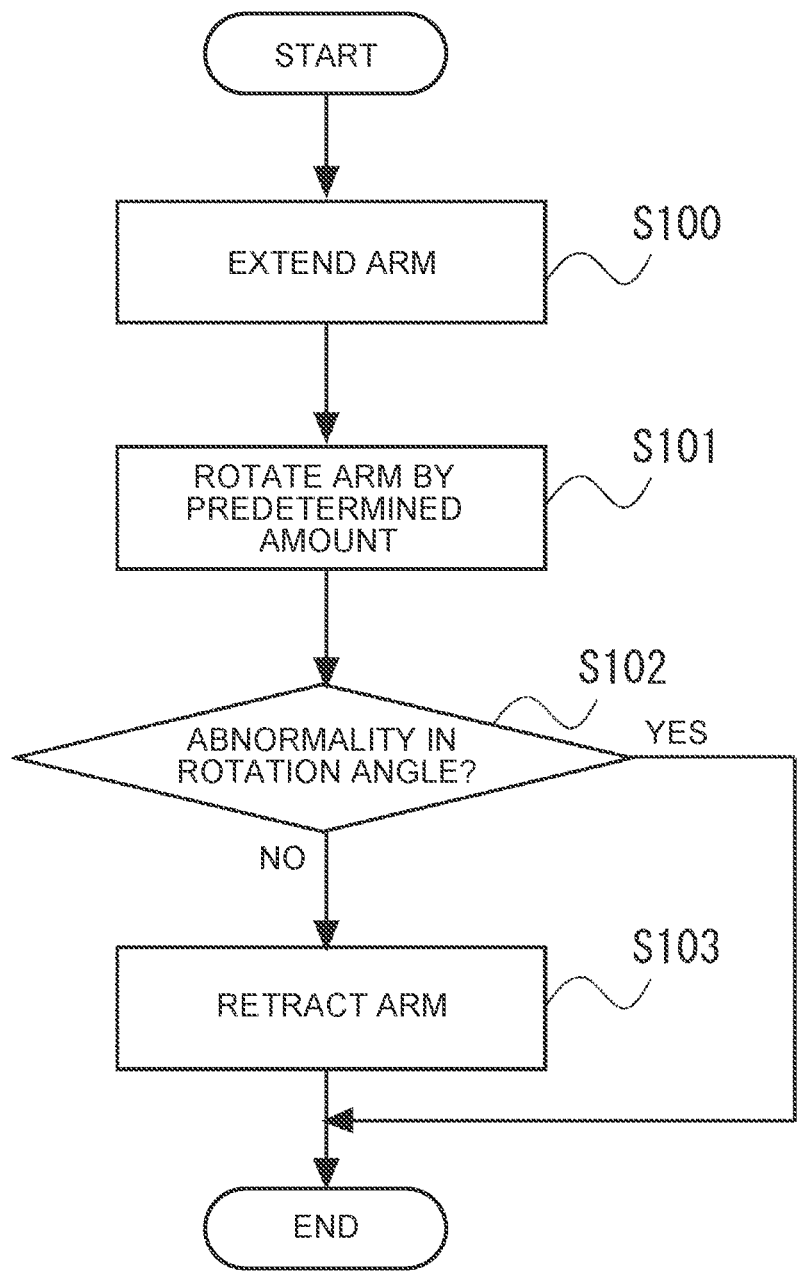

CONVEYANCE SYSTEM, CONVEYANCE METHOD AND COMPUTER-READABLE RECORDING MEDIUM

CROSS-REFERENCE TO RELATED APPLICATION

This application claims priority to Japanese Patent Application No. 2021-017625 filed on Feb. 5, 2021, incorporated herein by reference in its entirety.

BACKGROUND

1. Technical Field

This disclosure relates to a conveyance system and a conveyance method.

2. Description of Related Art

Japanese Unexamined Patent Application Publication No. 11-29207 (JP 11-29207 A) describes a cargo transfer apparatus including a hook engageable with an engaged portion of a container, and the cargo transfer apparatus moves the container with the hook being engaged with the engaged portion.

SUMMARY

According to the technology described in JP 11-29207 A, there is such a problem that an operator might continue an operation without noticing that the hook is not engaged with the engaged portion of the container, and goods might drop during the operation.

This disclosure has been accomplished in order to solve such a problem, and an object of the disclosure is to provide a conveyance system and a conveyance method each of which can reduce such a risk that an object drops when the object is put in and out of a rack.

A conveyance system according to one aspect of this disclosure is a conveyance system for conveying an object by use of a conveyance robot. The conveyance robot includes an arm, a drive mechanism, and a detecting unit. The arm includes: a shaft portion extensible and retractable in an axial direction of the shaft portion; and a protruding portion extending from the shaft portion in a direction different from the axial direction. The protruding portion is configured to be engaged with a groove formed on the object. The drive mechanism is configured to rotate the arm around the axial direction as a rotating axis. The detecting unit is configured to detect an abnormality in the rotation angle of the arm.

A conveyance method according to one aspect of this disclosure is a conveyance method for conveying an object by use of a conveyance robot. The conveyance robot includes an arm including a shaft portion extensible and retractable in an axial direction of the shaft portion, and a protruding portion extending from the shaft portion in a direction different from the axial direction. The protruding portion is configured to be engaged with a groove formed on the object. The conveyance method includes: a driving step of rotating the arm around the axial direction as a rotating axis; and a detecting step of detecting an abnormality in the rotation angle of the arm.

This disclosure can achieve a reduction of a risk of dropping an object when the object is put in or out of a rack.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 16 is a flowchart illustrating an exemplary procedure of a conveyance method according to the present embodiment.

DETAILED DESCRIPTION OF EMBODIMENTS

The following describes the present disclosure based on embodiments of the disclosure but are not intended to limit the disclosure according to Claims to the following embodiments. Further, all constituents described in the embodiments are not necessarily essential as the means for solving the problem of the disclosure.

The following will describe a conveyance system according to an embodiment with reference to the drawings. The conveyance system according to the embodiment includes a conveyance robot 10. The conveyance system is a conveyance system in which the conveyance robot 10 conveys an object such as goods.

Note that the conveyance system may include a server configured to control traveling of the conveyance robot 10, or the conveyance robot 10 may autonomously move by generating a conveyance route by itself. A system in which processes are self-contained in a conveyance robot including no server can be also included in the conveyance system according to the embodiment.

Figure 1:
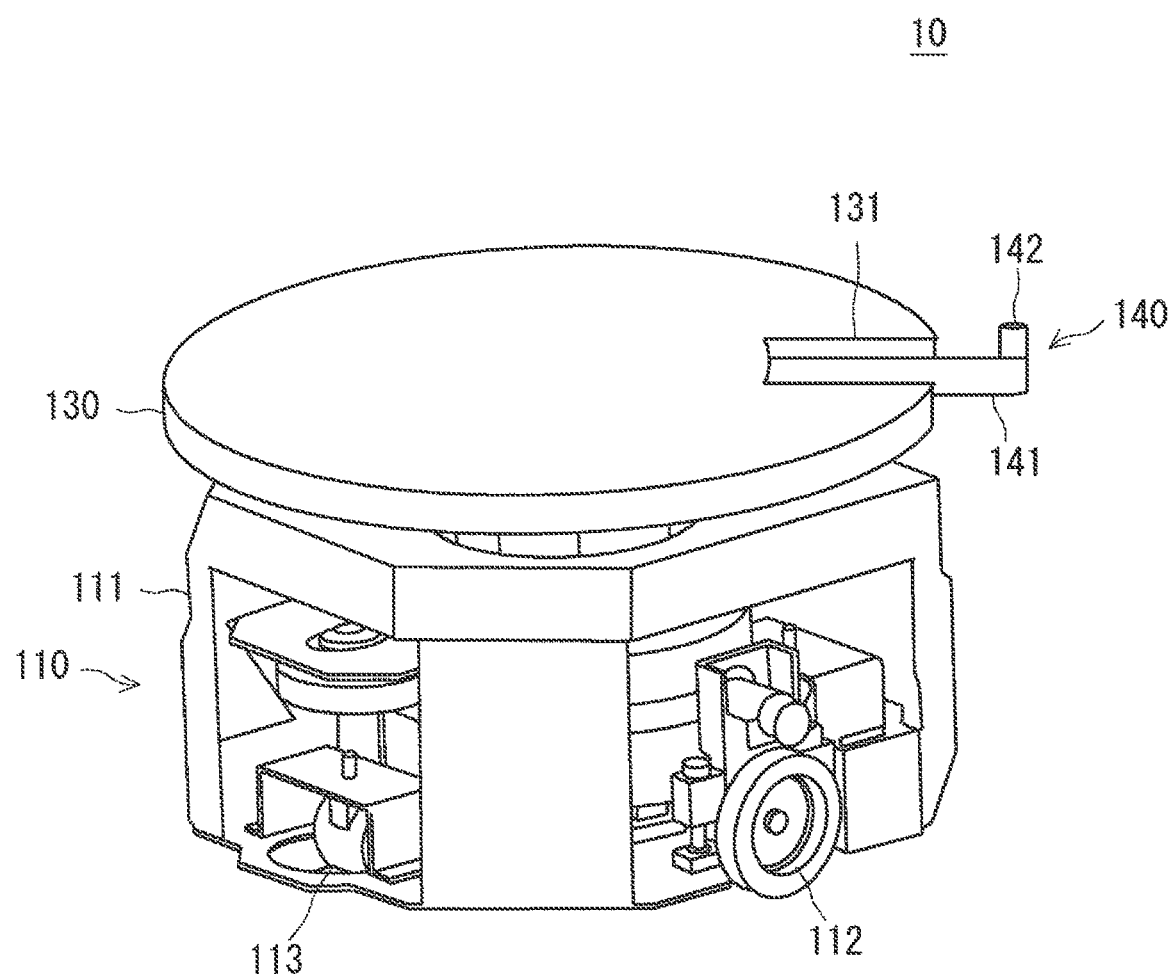
FIG. 1 is a perspective view illustrating a configuration of a conveyance robot according to an embodiment.
Figure 2:
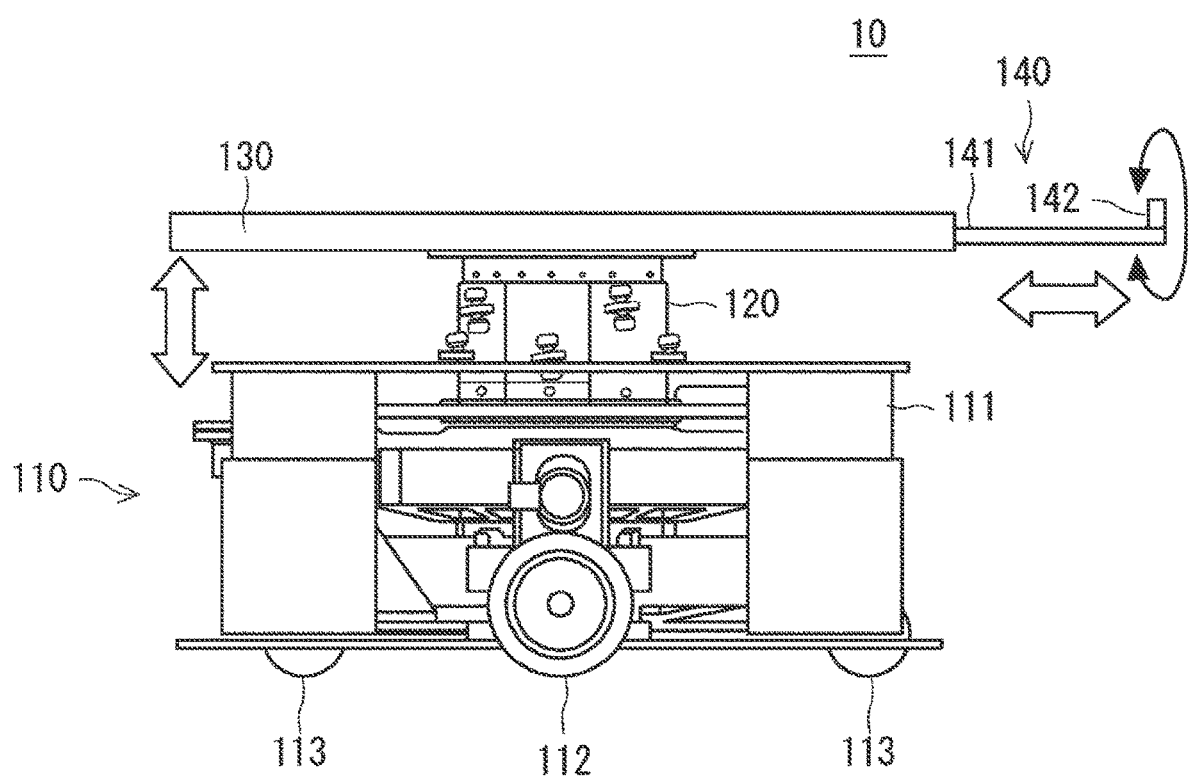
FIG. 2 is a side view illustrating the configuration of the conveyance robot according to the embodiment.
Figure 3:
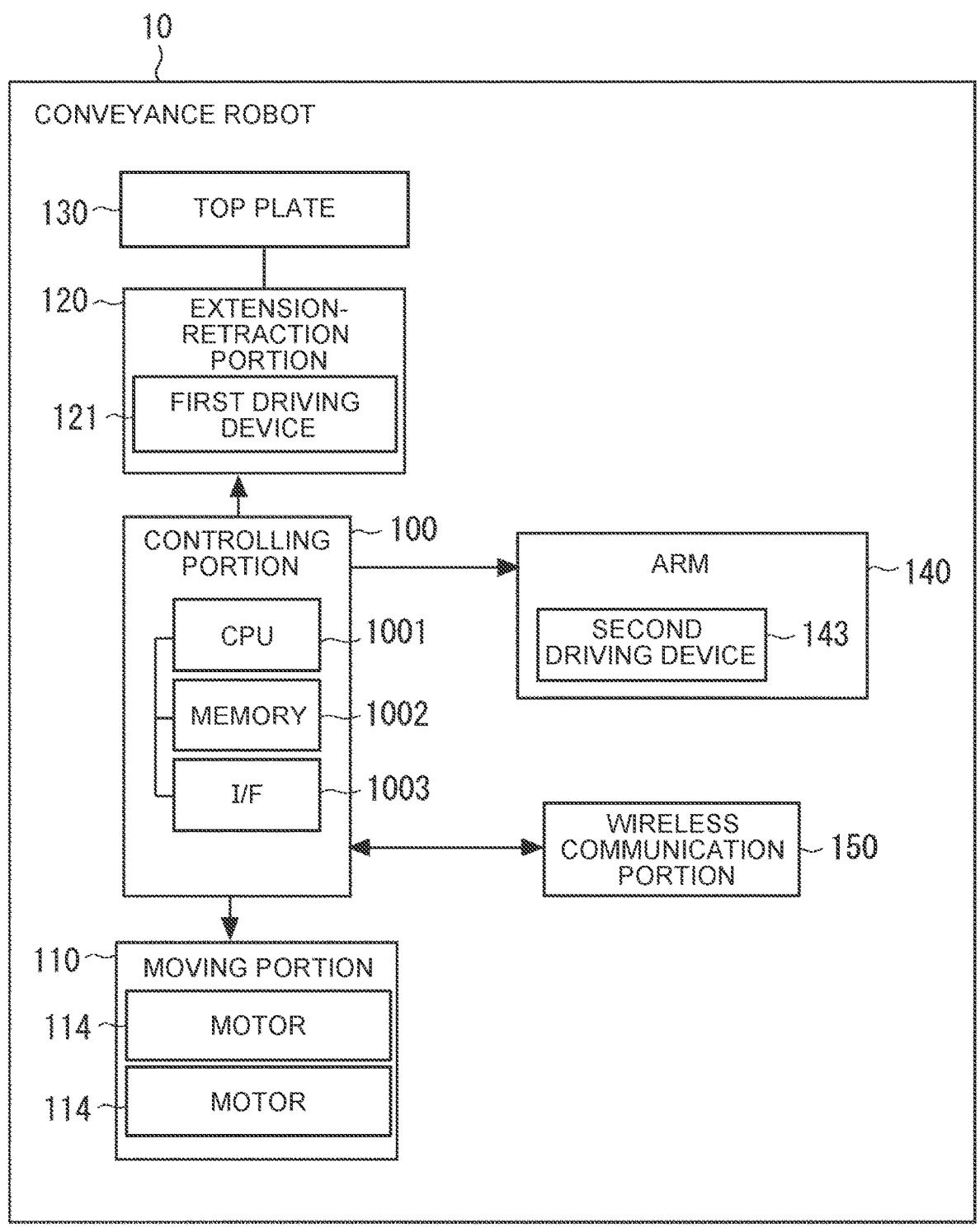
FIG. 3 is a block diagram illustrating functions of the conveyance robot according to the embodiment.

FIG. 1 is a perspective view illustrating a schematic configuration of the conveyance robot 10 included in the conveyance system according to the present embodiment. FIG. 2 is a side view illustrating a schematic configuration of the conveyance robot 10. FIG. 3 is a block diagram illustrating a schematic system configuration of the conveyance robot 10.

The conveyance robot 10 includes a movable moving portion 110, an extension-retraction portion 120 configured to extend and retract in the up-down direction, a top plate 130 configured to support an object placed thereon, an arm 140, a controlling portion 100 configured to control the conveyance robot 10, including controls on the moving portion 110, the extension-retraction portion 120, and the arm 140, and a wireless communication portion 150.

The moving portion 110 includes a robot main body 111, a pair of right and left driving wheels 112 and a pair of front and rear driven wheels 113 rotatably provided in the robot main body 111, and a pair of motors 114 configured to rotationally drive the driving wheels 112. The motors 114 rotate the driving wheels 112, respectively, via respective speed reducers or the like. When the motors 114 rotate the driving wheels 112 in response to a control signal from the controlling portion 100, the robot main body 111 is allowed to move forward, move rearward, and rotate. Hereby, the robot main body 111 can be moved to a given position. Note that configuration of the moving portion 110 is an example, and the moving portion 110 is not limited to this. For example, the numbers of the driving wheels 112 and the driven wheels 113 in the moving portion 110 can be any numbers, and the moving portion 110 can employ any configuration, provided that the moving portion 110 can move the robot main body 111 to a given position.

The extension-retraction portion 120 is an extension-retraction mechanism configured to extend and retract in the up-down direction. The extension-retraction portion 120 may be configured as a telescopic extension-retraction mechanism. The top plate 130 is provided in an upper end part of the extension-retraction portion 120, and the top plate 130 is raised and lowered by operation of the extension-retraction portion 120. The extension-retraction portion 120 includes a first driving device 121 such as a motor, and the extension-retraction portion 120 is driven by the first driving device 121 so as to extend and retract. That is, the top plate 130 is raised and lowered by the driving of the first driving device 121. The first driving device 121 drives the extension-retraction portion 120 in response to a control signal from the controlling portion 100. Note that the conveyance robot 10 may employ a well-known given mechanism configured to control the height of the top plate 130 instead of the extension-retraction portion 120.

The top plate 130 is provided in an upper part (a distal end) of the extension-retraction portion 120. The top plate 130 is raised and lowered by a driving device such as a motor. In the present embodiment, the top plate 130 is used to place, thereon, an object to be conveyed by the conveyance robot 10. For the conveyance, the conveyance robot 10 moves together with the object with the object being supported by the top plate 130. Hereby, the conveyance robot 10 conveys the object.

The top plate 130 is constituted by a plate material serving as a top face and a plate material serving as a lower face, for example, and the top plate 130 may have a space between the top face and the lower face such that the arm 140 is accommodated in the space. In the embodiment, the shapes of the plate materials, that is, the shape of the top plate 130 is a flat disc shape, for example, but may be any other shapes. Further, the top plate 130 may be provided with a notch 131 formed along a line of flow of the arm 140.

The arm 140 configured to extend and retract in the horizontal direction is attached to the top plate 130. The arm 140 includes a shaft portion 141 extensible and retractable in its axial direction (in a direction along the shaft portion 141, further in other words, the longitudinal direction of the arm 140), and a protruding portion 142. The protruding portion 142 extends from the shaft portion 141 in a direction different from the axial direction and is engaged with a groove formed on an object to be conveyed. Here, the protruding portion 142 may extend in a direction perpendicular to the shaft portion 141 at a distal end of the shaft portion 141. That is, the arm 140 may have an L-shape.

Further, the top plate 130 is provided with a second driving device 143 configured to perform extension and retraction of the shaft portion 141 and rotation of the arm 140 in response to a control signal from the controlling portion 100. The second driving device 143 is also called a drive mechanism. The second driving device 143 includes, for example, a motor and a linear guide so as to perform extension and retraction of the shaft portion 141 and rotation of the arm 140. As the second driving device 143, a well-known given mechanism configured to perform these motions may be employed. The mechanism used for extension and retraction of the shaft portion 141 is not limited to a guide rail mechanism.

Figure 4:
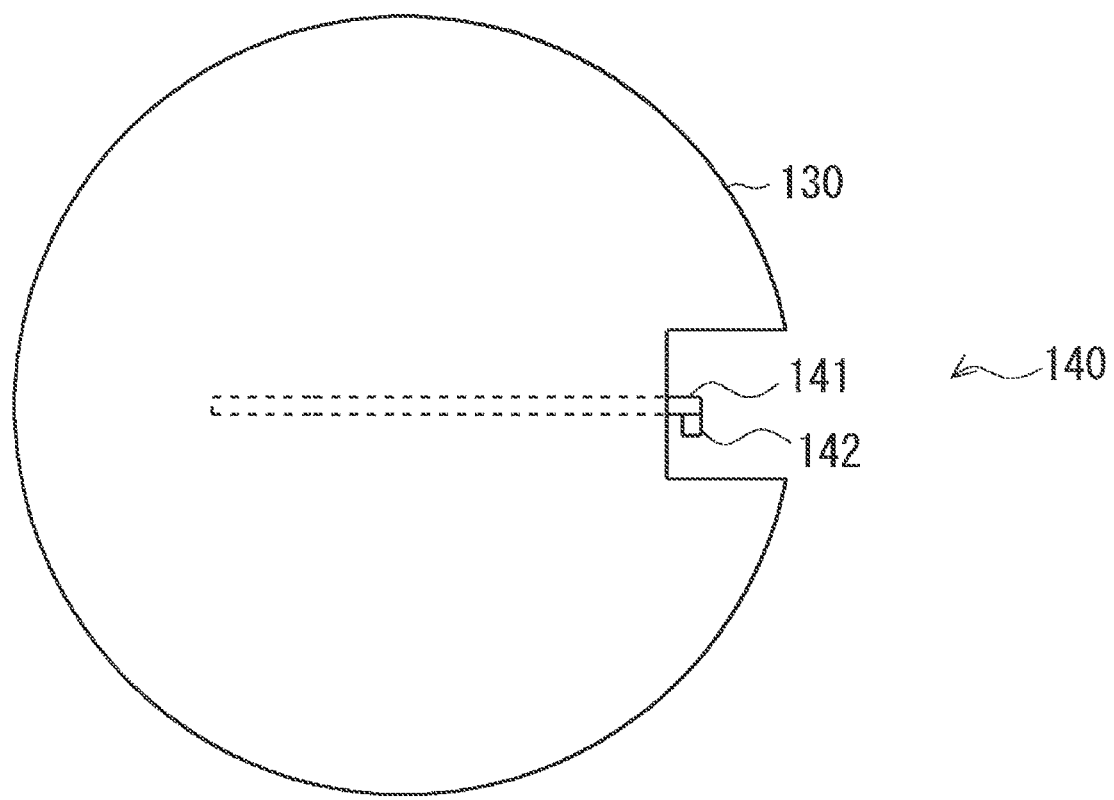
FIG. 4 is a schematic plan view illustrating a state where the conveyance robot according to the embodiment retracts its arm.
Figure 5:
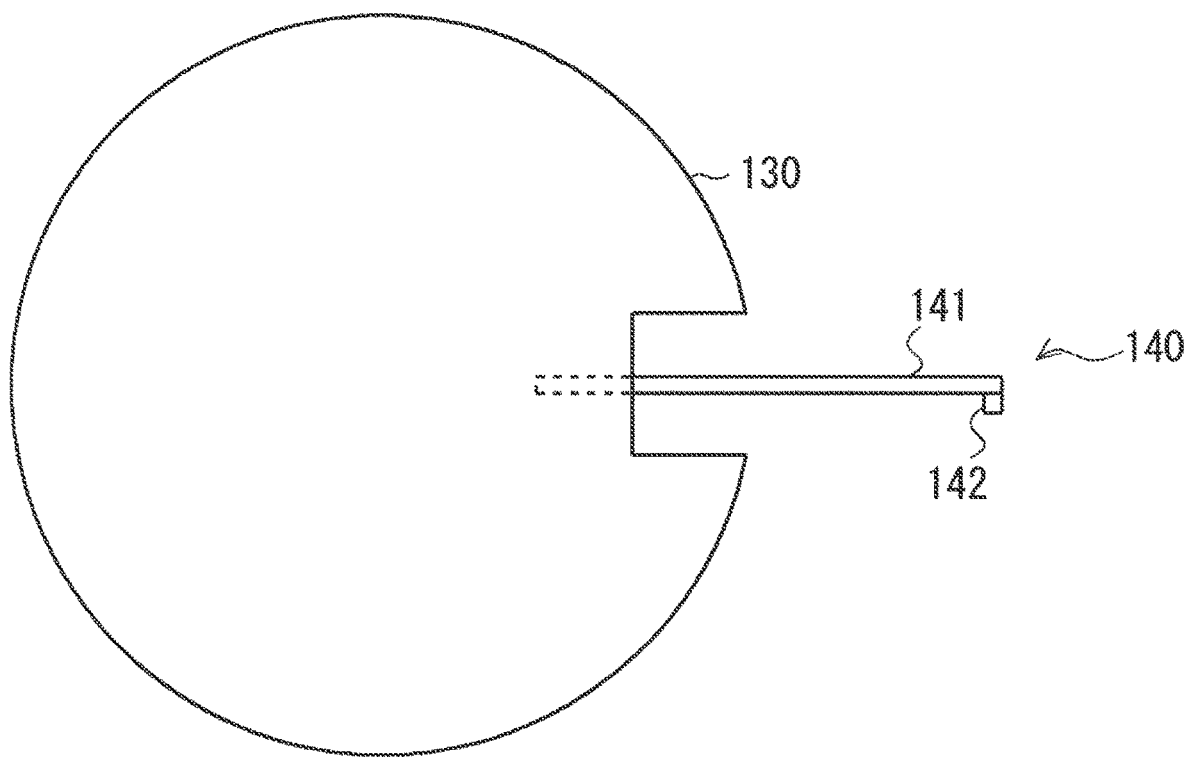
FIG. 5 is a schematic plan view illustrating a state where the conveyance robot according to the embodiment extends the arm.
Figure 6:
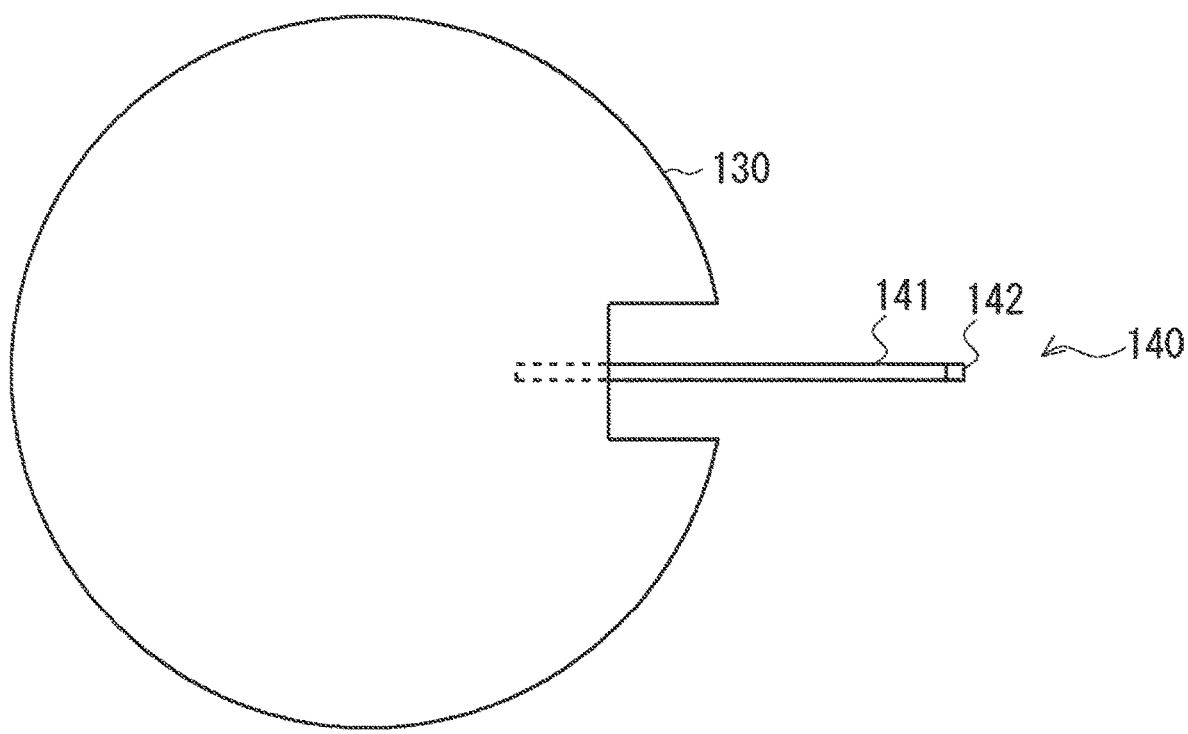
FIG. 6 is a schematic plan view illustrating a state where the arm is rotated by a predetermined amount after the conveyance robot according to the embodiment extends the arm.

Here, the movement of the arm 140 is illustrated in FIGS. 4 to 6. FIG. 4 is a schematic plan view illustrating a state where the shaft portion 141 of the arm 140 is retracted. FIG. 5 is a schematic plan view illustrating a state where the shaft portion 141 of the arm 140 is extended. FIG. 6 is a schematic plan view illustrating a state where the arm 140 is rotated by a predetermined amount to cause the protruding portion 142 to face upward, after the shaft portion 141 of the arm 140 is extended.

Thus, the arm 140 is extensible and retractable in the horizontal direction and can rotate the protruding portion 142 along with the rotation of the arm 140. That is, the protruding portion 142 is rotatable around the shaft portion 141 as a rotating axis. As will be described later, the conveyance robot 10 can detect an abnormality in the rotation angle of the arm 140.

Referring back to FIGS. 1 to 3, the wireless communication portion 150 is a circuit configured to perform wireless communication so as to communicate with a server, other robots, and so on as needed. For example, the wireless communication portion 150 includes a wireless transmission-reception circuit and an antenna. Note that the wireless communication portion 150 may be omitted in a case where the conveyance robot 10 does not communicate with other devices.

The controlling portion 100 is a device configured to control the conveyance robot 10 and includes a processor 1001, a memory 1002, and an interface (IF) 1003. The processor 1001, the memory 1002, and the interface 1003 are connected to each other via data buses and the like.

The interface 1003 is an input-output circuit to be used to communicate with other devices such as the moving portion 110, the extension-retraction portion 120, the arm 140, and the wireless communication portion 150.

The memory 1002 is constituted by a volatile semiconductor memory and a nonvolatile semiconductor memory in combination, for example. The memory 1002 is used to store software (computer programs) including one or more orders and executed by the processor 1001, data to be used for various processes of the conveyance robot 10, and so on.

The processor 1001 may be, for example, a microprocessor, a microprocessor unit (MPU), a central processing unit (CPU), or the like. The processor 1001 may include a plurality of processors. Thus, the controlling portion 100 is a device functioning as a computer.

Note that the programs can be stored by use of various types of non-transitory computer readable media and supplied to the computer. The non-transitory computer readable media include various types of tangible storage media. Examples of the non-transitory computer readable media include magnetic recording media (e.g., a flexible disk, a magnetic tape, a hard disk drive), optical magnetic recording media (e.g., a magneto-optical disk), a CD read-only memory (CD-ROM), a CD-R, a CD-R/W, and a semiconductor memory (e.g., a mask ROM, a programmable ROM (PROM), an erasable PROM (EPROM), a flash ROM, and a random access memory (RAM)). Further, the programs can be supplied to the computer by various types of transitory computer readable media. Examples of the transitory computer readable media include an electrical signal, an optical signal, and an electromagnetic wave. The transitory computer readable media can supply the programs to the computer via a wired communication channel such as an electric wire or an optical fiber, or a wireless communication channel.

Figure 7:
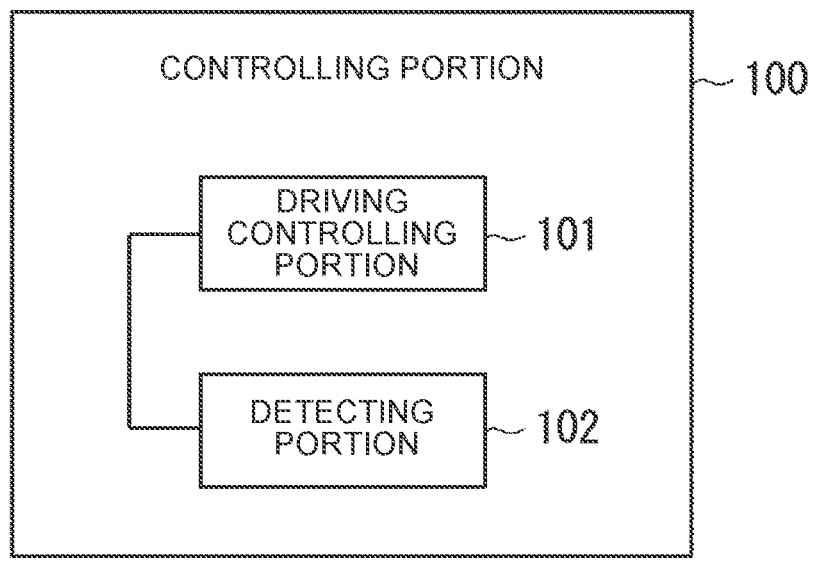
FIG. 7 is a block diagram illustrating functions of a controlling portion of the conveyance robot.

Next will be described the process of the controlling portion 100. FIG. 7 is a block diagram illustrating a functional configuration of the controlling portion 100. The controlling portion 100 includes a driving controlling portion 101 and a detecting portion 102. The driving controlling portion 101 controls the rotation of the driving wheels 112 by transmitting control signals to the motors 114 of the moving portion 110, and hereby, the driving controlling portion 101 can move the robot main body 111 to a given position. Further, the driving controlling portion 101 can control the height of the top plate 130 by transmitting a control signal to the first driving device 121.

Note that the driving controlling portion 101 may control the movement of the conveyance robot 10 by performing a well-known control such as a feedback control or a robust control based on rotation information or the like on the driving wheels 112 that is detected by respective rotation sensors provided in the driving wheels 112. Further, the driving controlling portion 101 may autonomously move the conveyance robot 10 by controlling the moving portion 110 based on distance information detected by a range sensor provided in the conveyance robot 10 or map information on a movement environment. The range sensor is, for example, a camera, an ultrasonic sensor, or the like.

Further, the driving controlling portion 101 can control extension and retraction of the shaft portion 141 and the rotation angle of the arm 140 by transmitting a control signal to the second driving device 143. For example, the driving controlling portion 101 extends the shaft portion 141 and then rotates the arm 140 so that the protruding portion 142 faces upward. When the driving controlling portion 101 transmits a control signal to the second driving device 143, a drawing operation to draw an object from a rack (described later) or a push-in operation to push an object into the rack is executed. In a case where the detecting portion 102 detects an abnormality in the rotation angle of the arm 140, the driving controlling portion 101 may cause an alarm to go off, stop the drawing operation to draw an object 90, or perform a retry operation.

The detecting portion 102 can detect an abnormality in the rotation angle of the arm 140. For example, the detecting portion 102 may detect an abnormality in the rotation angle based on a current value of a motor configured to rotate the arm 140, the motor being provided in the second driving device 143. For example, in a case where the current value is a threshold or more, the detecting portion 102 detects an abnormality in the rotation angle of the arm 140. Note that the detecting portion 102 may detect an abnormality in the rotation angle of the arm 140 based on a physical quantity other than the current, e.g., impedance, torque, or the like.

Further, the detecting portion 102 may detect an abnormality in the rotation angle based on a detection result obtained by an encoder attached to the motor configured to rotate the arm 140. For example, the detecting portion 102 may detect an abnormality in the rotation angle based on whether or not a difference (location deviation) between a designated position and a position based on the detection result from the encoder exceeds a threshold.

In a case where an abnormality in the rotation angle is detected, the driving controlling portion 101 may stop the drawing operation or the push-in operation on the object 90 by the arm 140. The detecting portion 102 may detect an abnormality in the rotation angle when the protruding portion 142 is to be engaged with a groove formed on the object 90, or the detecting portion 102 may detect an abnormality in the rotation angle when the shaft portion 141 is to be retracted or extended in a state where the protruding portion 142 is engaged with the groove.

Figure 8:
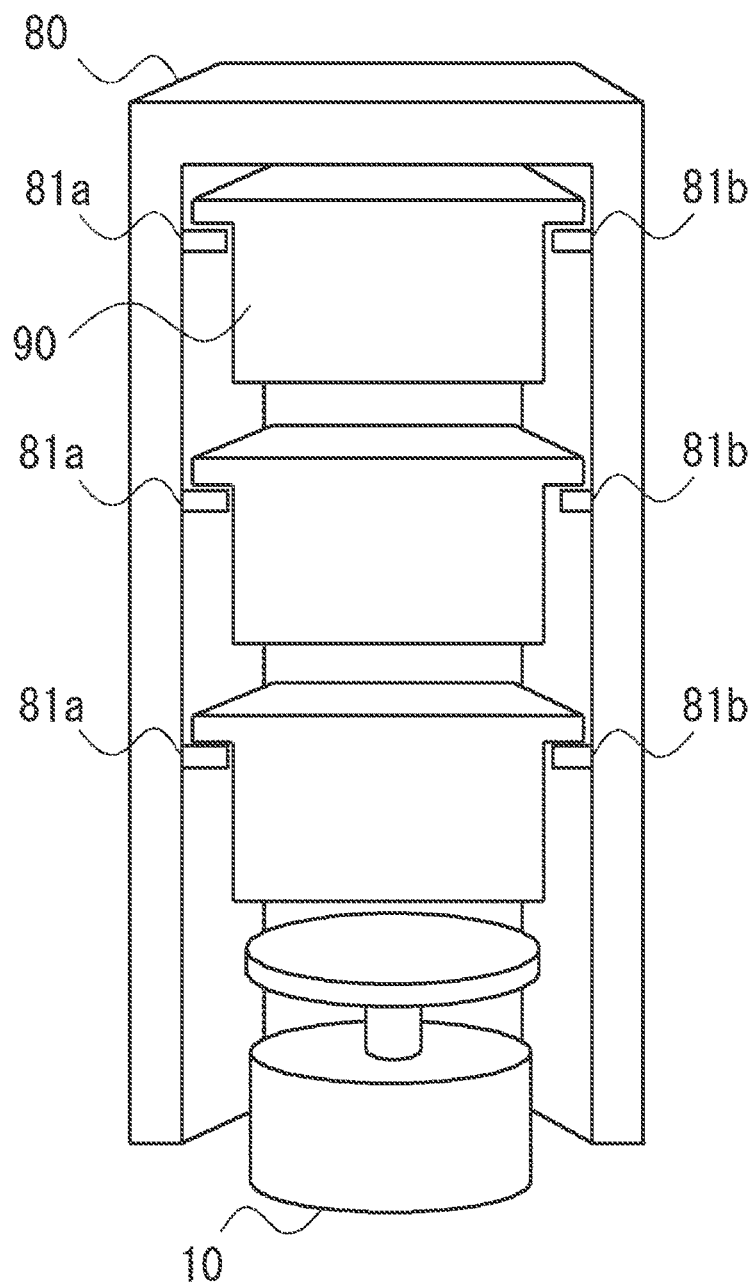
FIG. 8 is a schematic view illustrating a configuration of the rack in which an object to be conveyed by the conveyance robot is accommodated.
Figure 9:
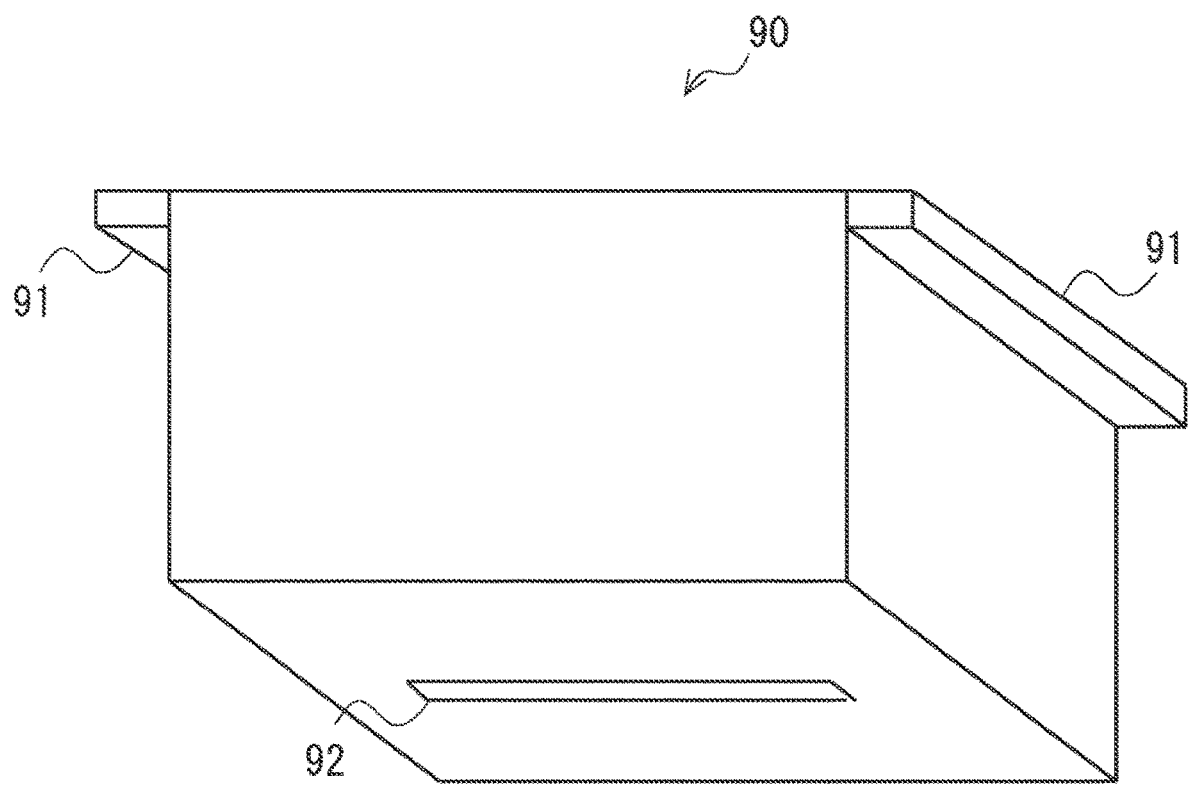
FIG. 9 is a perspective view illustrating the shape of the object to be conveyed by the conveyance robot.

Next will be described details of an object as a conveyance target to be conveyed by the conveyance robot 10. FIG. 8 is a schematic view illustrating a rack 80 and the object 90 accommodated in the rack 80 as a conveyance target. Note that, in FIG. 8, the conveyance robot 10 placed in front of the rack 80 is also illustrated. Further, FIG. 9 is a perspective view illustrating a front face, a bottom face, and a side face of the object 90. As illustrated in FIG. 8, when the conveyance robot 10 moves the object 90 onto the top plate 130 or when the conveyance robot 10 moves the object 90 put on the top plate 130 into the rack 80, the conveyance robot 10 moves to a position close to the rack 80. For example, the conveyance robot 10 moves in front of the rack 80 and at an intermediate point between paired rails 81*a*, 81*b* provided in the rack 80.

The rack 80 includes the rails 81*a*, 81*b* configured to support the opposite sides of the object 90. The rails 81*a*, 81*b* are provided at the same height so as to be parallel to each other. A first side of the object 90 accommodated in the rack 80 is supported by the rail 81*a*, and a second side of the object 90 is supported by the rail 81*b*. The rails 81*a*, 81*b* are both provided over from a front face of the rack 80 to a back face of the rack 80.

The opposite sides of the object 90 are provided with ribs 91 as illustrated in FIG. 9, for example. When the ribs 91 are supported by the rails 81*a*, 81*b* from the lower side, the object 90 is supported in the rack 80. Note that the ribs 91 are provided on the opposite sides of the object 90 such that the ribs 91 are provided over from the front face of the object 90 to a back face of the object 90. In the example illustrated in FIG. 9, the ribs 91 are provided in respective upper parts on the opposite sides of the object 90. However, the ribs 91 may be provided in respective lower parts on the opposite sides of the object 90, for example, and the ribs 91 may not necessarily be provided in the respective upper parts. Further, in a case where the rails 81*a*, 81*b* support the bottom face of the object 90, the ribs 91 may not necessarily be provided in the object 90.

As such, the rack 80 supports the opposite sides of the object 90 by the rails 81*a*, 81*b* from the lower side. The object 90 is movable in the front-rear direction inside the rack 80 along the rails 81*a*, 81*b*. That is, when the object 90 is pushed in toward the back face of the rack 80, the object 90 is accommodated inside the rack 80. Reversely, when the object 90 is drawn toward the front face of the rack 80, the object 90 can be taken out of the rack 80.

As illustrated in FIG. 9, a groove 92 is formed at a predetermined position on the bottom face of the object 90 such that the protruding portion 142 of the arm 140 is caught in the groove 92. The groove 92 may have a semicylindrical shape the axial direction of which is along the drawing direction of the object 90, for example. Note that the object 90 is, for example, a rectangular-solid shaped container. However, the object 90 is not limited to this and may be any object. Any other object can be accommodated inside the object 90 as a container.

Figure 10:
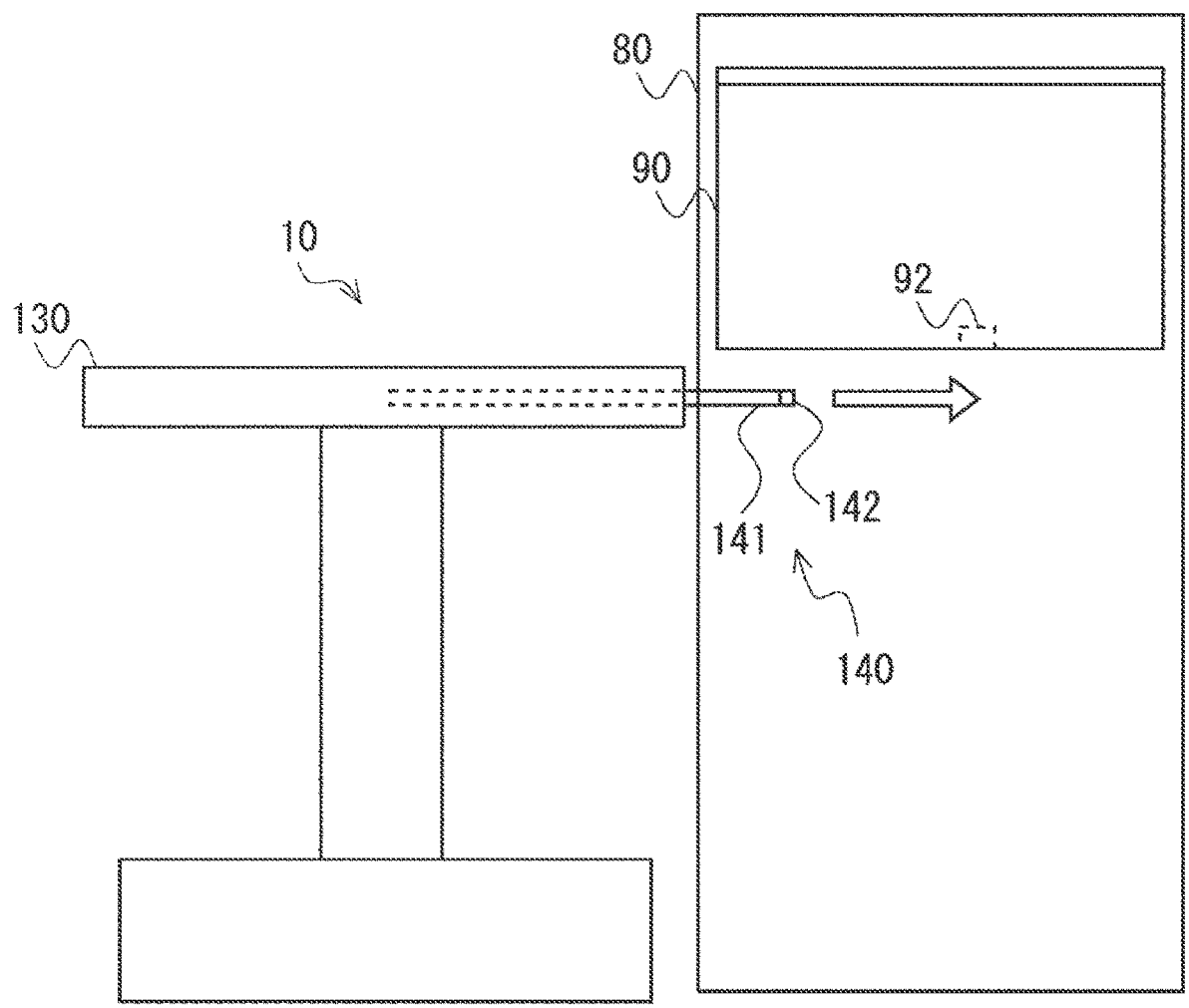
FIG. 10 is a schematic side view illustrating a state before the conveyance robot according to the embodiment draws the object.
Figure 11:
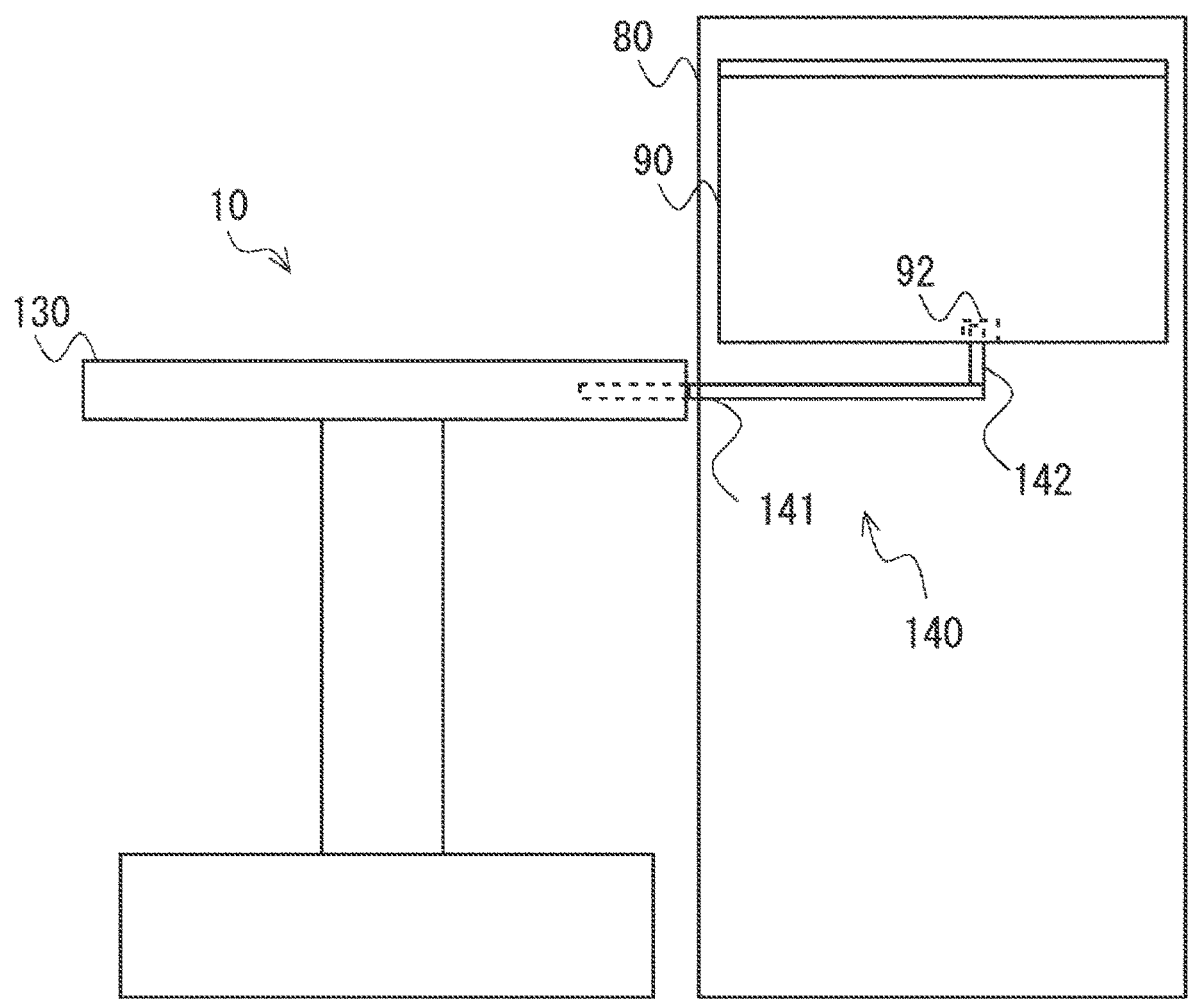
FIG. 11 is a schematic side view illustrating a state where the conveyance robot according to the embodiment engages the arm with a groove formed on the object.
Figure 12:
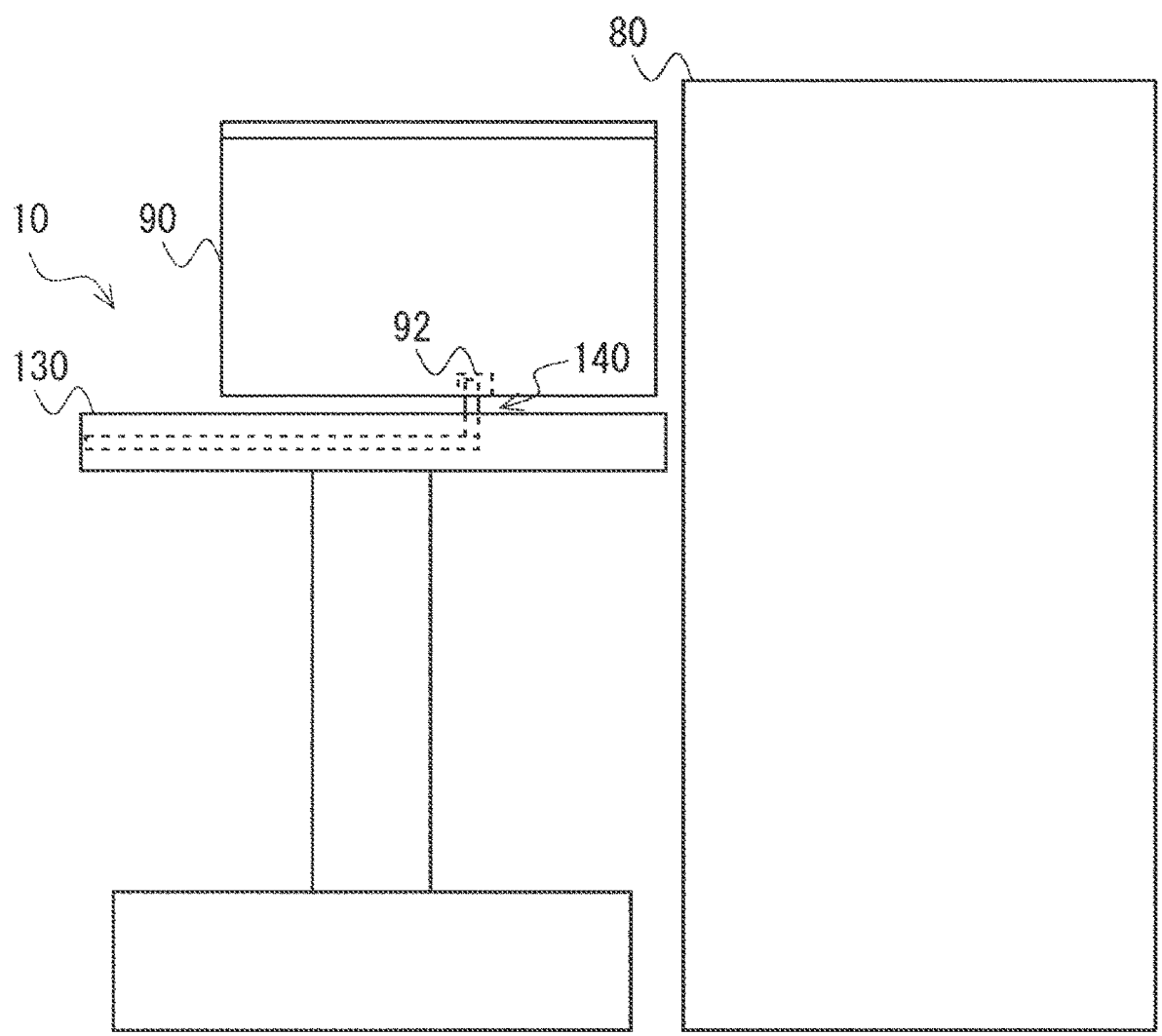
FIG. 12 is a schematic side view illustrating a state after the conveyance robot according to the embodiment draws out the object.

The controlling portion 100 of the conveyance robot 10 operates the arm 140 so that the object 90 is moved from the rack 80 onto the top plate 130, or the object 90 is moved from the top plate 130 into the rack 80. FIGS. 10 to 12 are schematic side views each illustrating an operation to place the object 90 accommodated inside the rack 80 onto the top plate 130.

First, the controlling portion 100 extends the arm 140 by a predetermined length, so that the protruding portion 142 of the arm 140 is moved to the groove 92 formed on the object 90 (see FIG. 10). Note that the conveyance robot 10 may include a sensor such as a camera configured to detect the position of the groove 92 of the object 90 and may determine an extension length for the arm 140 based on a detection result by the sensor.

Here, the protruding direction of the protruding portion 142 is along the horizontal direction. Accordingly, the arm 140 can be inserted into a small space on the bottom face side of the object 90 as a conveyance target (e.g., a small gap between the object 90 as the conveyance target and the object 90 accommodated at a position that is one stage lower than the object 90 as the conveyance target).

Figure 13:
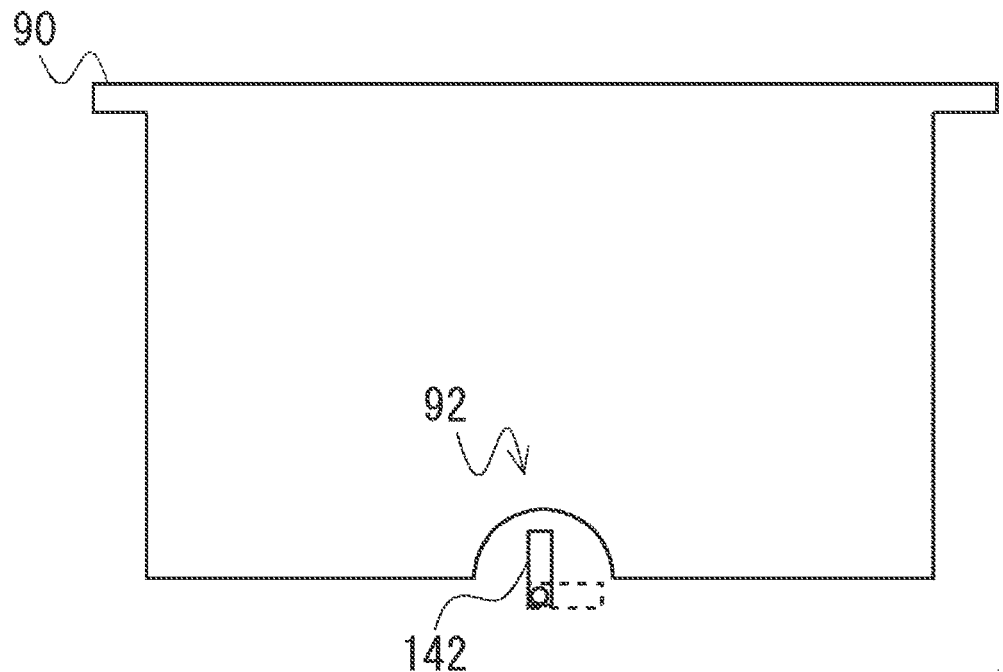
FIG. 13 is a schematic front view illustrating a state where a protruding portion of the arm is put in the groove of the object.

After the controlling portion 100 extends the arm 140, the controlling portion 100 rotates the arm 140 by a predetermined amount around the shaft portion 141 of the arm 140 as a rotating axis, as illustrated in FIG. 11. More specifically, the controlling portion 100 rotates the arm 140 by 90° so that the protruding portion 142 faces upward. Hereby, the protruding portion 142 is put into the groove 92 formed on the object 90. FIG. 13 is a schematic front view illustrating a state where the protruding portion 142 of the arm 140 is put in the groove 92 of the object 90. Note that a state of the protruding portion 142 before the arm 140 is rotated is indicated by a dotted line.

Figure 14:
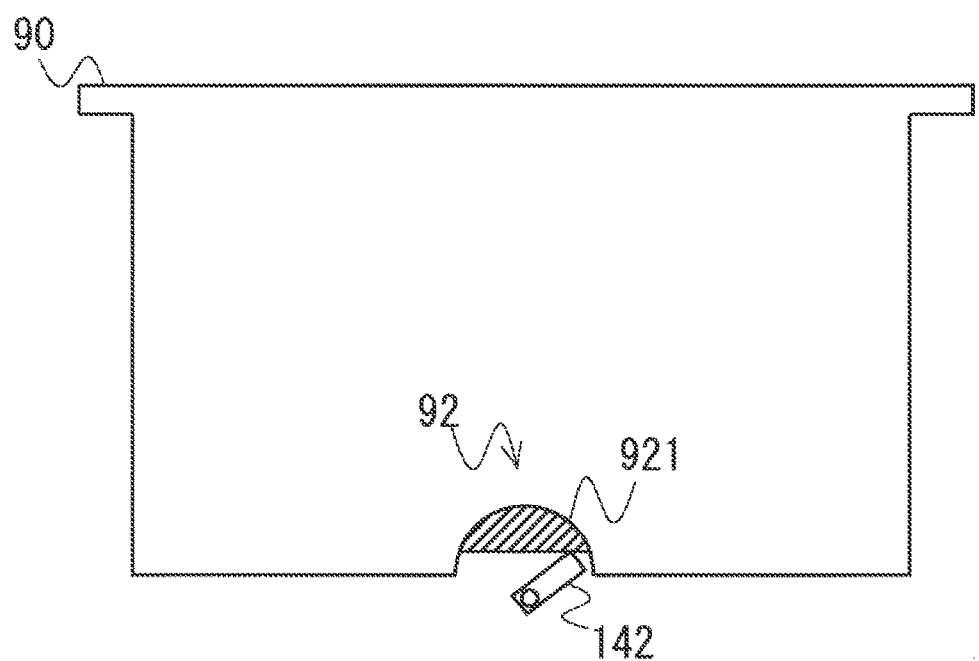
FIG. 14 is a schematic front view illustrating a state where a foreign substance is filled in the groove of the object.

Here, in a case where the protruding portion 142 does not rotate sufficiently, the detecting portion 102 detects an abnormality in the rotation angle of the arm 140. FIG. 14 is a schematic front view illustrating a state where the arm 140 is rotated when a foreign substance 921 is filled in the groove 92. In such a case, even if the arm 140 is rotated, the protruding portion 142 cannot face upward. When the drawing operation is continued in such a state, the object 90 might drop. Since the current value of the motor configured to rotate the arm 140 is large or the location deviation in the rotation angle of the arm 140 is large, the detecting portion 102 can detect an abnormality in the rotation angle of the arm 140.

In a case where an abnormality in the rotation angle of the arm 140 is detected, the conveyance robot 10 stops the drawing operation on the object 90. In the meantime, in a case where no abnormality in the rotation angle is detected, the conveyance robot 10 retracts the arm 140 caught in the groove 92, as illustrated in FIG. 12. Hereby, the object 90 is drawn out from the rack 80 and moved onto the top plate 130.

In the meantime, when the controlling portion 100 pushes, into the rack 80, the arm 140 caught in the groove 92 of the object 90 placed on the top plate 130, the controlling portion 100 can accommodate the object 90 on the top plate 130 into the rack 80. When the arm 140 is to be engaged with the groove 92 of the object 90 on the top plate 130, the detecting portion 102 may detect an abnormality in the rotation angle of the arm 140.

Figure 15:
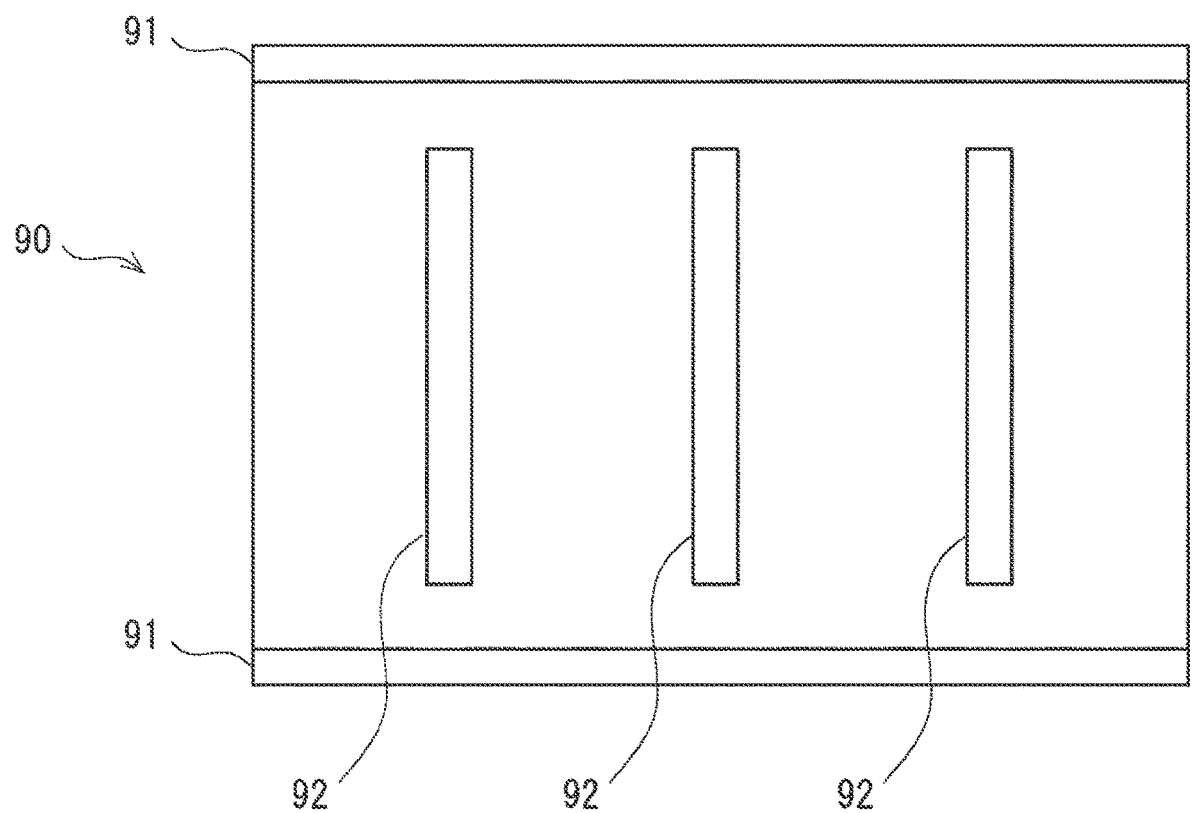
FIG. 15 is a bottom view illustrating an example of the groove formed on the object to be conveyed by the conveyance robot.

In the meantime, one groove 92 may be provided in the object 90 as illustrated in FIG. 9, or a plurality of grooves 92 may be provided as illustrated in FIG. 15. FIG. 15 is a bottom plan view of the object 90. More specifically, the object 90 includes a plurality of grooves 92 provided side by side in a vertical direction, that is, in the moving direction of the object 90. In this case, in a case where the controlling portion 100 of the conveyance robot 10 moves the object 90 accommodated in the rack 80 onto the top plate 130, the controlling portion 100 may repeat the drawing operation to draw the object 90 from the rack 80 by causing the protruding portion 142 of the arm 140 to be sequentially caught in the grooves 92 from the top plate 130 side. Similarly, in a case where the controlling portion 100 of the conveyance robot 10 moves the object 90 put on the top plate 130 into the rack 80, the controlling portion 100 may repeat the push-in operation to push the object 90 into the rack 80 by causing the distal end of the arm 140 to be sequentially caught in the grooves 92 from the rack 80 side.

In a case where any of the grooves 92 is damaged by a foreign substance or the like, the conveyance robot 10 may drop the object 90 when the conveyance robot 10 moves the object 90 in or out of the rack 80. Since the conveyance robot 10 detects an abnormality in the rotation angle of the arm 140 and stops the drawing operation on the object 90 or the push-in operation on the object 90, it is possible to reduce a risk of dropping the object 90.

Next will be described the drawing operation performed by the conveyance robot 10 to draw the object 90 from the rack 80, with reference to a flowchart. FIG. 16 is a flowchart illustrating an operation to be performed by the conveyance robot 10 to move the object 90 from the rack 80 onto the top plate 130. Note that the conveyance robot 10 moves to be placed at a predetermined position in front of the rack 80 in advance.

In step S100, the controlling portion 100 extends the arm 140 only by a predetermined distance so as to move the distal end of the arm 140 to the groove 92 on the bottom face of the object 90 (step S100). Subsequently, in step S101, the controlling portion 100 rotates the arm 140 by a predetermined amount (step S101). That is, the controlling portion 100 rotates the arm 140 so that the protruding portion 142 of the arm 140 faces upward.

Subsequently, in step S102, the controlling portion 100 determines whether or not the rotation angle of the arm 140 is abnormal (step S102). In a case where the rotation angle of the arm 140 is normal (No in step S102), the controlling portion 100 continues the drawing operation on the object 90 such that the controlling portion 100 retracts the arm 140 caught in the groove 92 and places the object 90 on the top plate 130 (step S103).

In the meantime, in a case where the rotation angle of the arm 140 is abnormal (Yes in step S102), the controlling portion 100 stops the process without performing the process of step S103. That is, in a case where the rotation angle of the arm 140 is abnormal, the controlling portion 100 stops the drawing operation on the object 90. After the controlling portion 100 stops the process, the controlling portion 100 may cause an alarm to go off or and may attempt a retry operation. For example, the controlling portion 100 may rotate the arm 140 such that protruding portion 142 faces in the horizontal direction, and after that, the controlling portion 100 may retract the arm 140 and return to the process of step S100.

Note that the conveyance robot 10 may perform the aforementioned abnormality detection in the push-in operation on the object 90. That is, the conveyance robot 10 may perform the above process when the protruding portion 142 is to be engaged with the groove 92 of the object 90 on the top plate 130. This makes it possible to reduce a risk of dropping the object 90 due to the object 90 being pushed into the rack 80 in a state where the protruding portion 142 is not engaged with the groove 92 sufficiently.

Further, in the course of performing the process of step S103, the controlling portion 100 may detect an abnormality in the rotation angle of the arm 140. In a case where an external force is applied to the object 90 while the conveyance robot 10 is drawing the object 90 from the rack 80, the conveyance robot 10 may stop the drawing operation to reduce a risk of dropping the object 90, or the conveyance robot 10 may make a warning by causing an alarm to go off.

In the end, the following describes details of effects to be yielded by the conveyance system according to the embodiment. An object having a groove may be put in or out of a rack by use of an arm having a protruding portion in some cases. Here, in a case where the groove is damaged, or in a case where a foreign substance is filled in the groove, the putting in or out of the object might not be completed normally. That is, in a case where an operation such as the putting in or out of the object is continued in a state where the protruding portion is not put in the groove formed on the object, the object might drop.

The conveyance robot according to the present embodiment can detect an abnormality in the rotation angle of the arm having the protruding portion. This makes it possible to prevent the operation from being continued in a state where the arm is not engaged with the object, thereby making it possible to reduce a risk of dropping the object.

Note that the present disclosure is not limited to the above embodiment, and various modifications can be made within a range that does not deviate from the gist of the present disclosure.

What is claimed is:

1. A conveyance system for conveying an object by use of a conveyance robot, wherein the conveyance robot includes:
   an arm including a shaft portion extensible and retractable in an axial direction of the shaft portion, and a protruding portion extending from the shaft portion in a direction different from the axial direction, the protruding portion being configured to be engaged with a groove formed on the object;
   a drive mechanism configured to rotate the arm around the axial direction as a rotating axis;
   a detecting unit configured to detect an abnormality in a rotation angle of the arm; and
   a top plate that supports an object placed thereon, wherein the top plate includes a top face comprising a first plate material and a lower face comprising a second plate material, and wherein the top plate has a space between the top face and the lower face and the arm is accommodated in the space;
   wherein the arm is extensible towards the groove formed in the object, and rotatable with the shaft portion as the rotation axis so that the protruding portion enters the groove formed in the object.

2. The conveyance system according to claim 1, wherein the detecting unit detects an abnormality in the rotation angle when the protruding portion is to be engaged with the groove, or when the shaft portion is to be retracted or extended in a state where the protruding portion is engaged with the groove.

3. The conveyance system according to claim 1, wherein, in a case where the detecting unit detects an abnormality, the conveyance robot stops a drawing operation to draw the object, or the conveyance robot causes an alarm to go off.

4. The conveyance system according to claim 1, wherein the detecting unit detects an abnormality in the rotation angle based on a current value of a motor configured to rotate the arm.

5. The conveyance system according to claim 1, wherein the detecting unit detects an abnormality in the rotation angle based on a detection result obtained by an encoder attached to a motor configured to rotate the arm.

6. The conveyance system of claim 1, wherein the arm comprises an L-shape.

7. A conveyance method for conveying an object by use of a conveyance robot, the conveyance robot including an arm including a shaft portion extensible and retractable in an axial direction of the shaft portion, and a protruding portion extending from the shaft portion in a direction different from the axial direction, the protruding portion being configured to be engaged with a groove formed on the object,
   wherein the arm is rotatable about an axis of the shaft portion to rotate the protruding portion to engage the groove formed in the object;
   the conveyance robot further including a top plate that supports an object placed thereon, wherein the top plate includes a top face comprising a first plate material and a lower face comprising a second plate material, and wherein the top plate has a space between the top face and the lower face and the arm is accommodated in the space;
   the conveyance method comprising:
   a driving step of rotating the arm around the axial direction as a rotating axis; and
   a detecting step of detecting an abnormality in a rotation angle of the arm.

8. The conveyance method according to claim 7, wherein the detecting step detects an abnormality in the rotation angle when the protruding portion is to be engaged with the groove, or when the shaft portion is to be retracted or extended in a state where the protruding portion is engaged with the groove.

9. The conveyance method of claim 7, wherein the top plate comprises a notch formed along a line of flow of the arm.

10. The conveyance method of claim 9, wherein in the case of retraction of the shaft portion, the drive mechanism is configured to maintain the protruding portion protruding above the top surface of the top plate through the notch, and in a case of extension of the shaft portion, the drive mechanism is configured to maintain the protruding portion with the direction from a base end to a tip end of the protruding portion along a horizontal direction.

11. The conveyance method of claim 9, wherein in a case of extension of the shaft portion, the drive mechanism is configured to maintain the protruding portion protruding above the top surface of the top plate through the notch, and in a case of retraction of the shaft portion, the drive mechanism is configured to maintain the protruding portion with a direction from a base end to a tip end of the protruding portion along a horizontal direction.

12. The conveyance method of claim 7, wherein the arm comprises an L-shape.

13. A computer-readable recording medium storing a program causing a computer to execute a process for conveying an object by use of a conveyance robot, the conveyance robot including an arm including a shaft portion extensible and retractable in an axial direction of the shaft portion, and a protruding portion extending from the shaft portion in a direction different from the axial direction, the protruding portion being configured to be engaged with a groove formed on the object,
- wherein the arm is rotatable about an axis of the shaft portion to rotate the protruding portion to engage the groove formed in the object;
- the conveyance robot further including a top plate that supports an object placed thereon, wherein the top plate includes a top face comprising a first plate material and a lower face comprising a second plate material, and wherein the top plate has a space between the top face and the lower face and the arm is accommodated in the space;
- the process comprising:
  - a driving step of rotating the arm around the axial direction as a rotating axis; and
  - a detecting step of detecting an abnormality in a rotation angle of the arm.

14. The conveyance system of claim 1, wherein the top plate comprises a notch formed along a line of flow of the arm.

15. The conveyance system of claim 14, wherein in the case of retraction of the shaft portion, the drive mechanism is configured to maintain the protruding portion protruding above the top surface of the top plate through the notch, and in a case of extension of the shaft portion, the drive mechanism is configured to maintain the protruding portion with the direction from a base end to a tip end of the protruding portion along a horizontal direction.

16. The conveyance system of claim 14, wherein in a case of extension of the shaft portion, the drive mechanism is configured to maintain the protruding portion protruding above the top surface of the top plate through the notch, and in a case of retraction of the shaft portion, the drive mechanism is configured to maintain the protruding portion with a direction from a base end to a tip end of the protruding portion along a horizontal direction.

17. The computer-readable recording medium of claim 13, wherein the top plate comprises a notch formed along a line of flow of the arm.

18. The computer-readable recording medium of claim 17, wherein in the case of retraction of the shaft portion, the drive mechanism is configured to maintain the protruding portion protruding above the top surface of the top plate through the notch, and in a case of extension of the shaft portion, the drive mechanism is configured to maintain the protruding portion with the direction from a base end to a tip end of the protruding portion along a horizontal direction.

19. The computer-readable recording medium of claim 17, wherein in a case of extension of the shaft portion, the drive mechanism is configured to maintain the protruding portion protruding above the top surface of the top plate through the notch, and in a case of retraction of the shaft portion, the drive mechanism is configured to maintain the protruding portion with a direction from a base end to a tip end of the protruding portion along a horizontal direction.

20. The computer-readable recording medium of claim 13, wherein the arm comprises an L-shape.

* * * * *